United States Patent
Kinder et al.

(10) Patent No.: US 7,276,886 B2
(45) Date of Patent: Oct. 2, 2007

(54) DUAL BUCK-BOOST CONVERTER WITH SINGLE INDUCTOR

(75) Inventors: Russell M. Kinder, Plano, TX (US); Marco Corsi, Parker, TX (US)

(73) Assignee: Texas Instruments Incorporated, Dallas, TX (US)

( * ) Notice: Subject to any disclaimer, the term of this patent is extended or adjusted under 35 U.S.C. 154(b) by 5 days.

(21) Appl. No.: 11/242,504

(22) Filed: Oct. 3, 2005

(65) Prior Publication Data

US 2007/0075689 A1    Apr. 5, 2007

(51) Int. Cl.
G05F 1/577    (2006.01)
G05F 1/24    (2006.01)

(52) U.S. Cl. ........................ 323/267; 323/259

(58) Field of Classification Search .......... 323/222, 323/265, 267, 268, 271, 282, 259, 344, 285, 323/350

See application file for complete search history.

(56) References Cited

U.S. PATENT DOCUMENTS 5,896,284 A * 4/1999 Murasato et al. ............ 363/124

* cited by examiner

*Primary Examiner*—Gary L Laxton
(74) *Attorney, Agent, or Firm*—Wade J. Brady, III; Frederick J. Telecky, Jr.

(57) ABSTRACT

A dual output buck-boost power converter operates with a single inductor to achieve high efficiency with automatic or inherent load balancing. Switches associated with the opposite polarity outputs are driven based on feedback signals, with one feedback signal being a reference voltage and another feedback signal being related to an opposite polarity output. The opposite polarity feedback signal is provided to a comparator with a reversed polarity to achieve a simple balanced control that maintains polarity outputs. The power converter delivers power to each output with each switching cycle and uses a single inductor to achieve high efficiency performance.

6 Claims, 3 Drawing Sheets

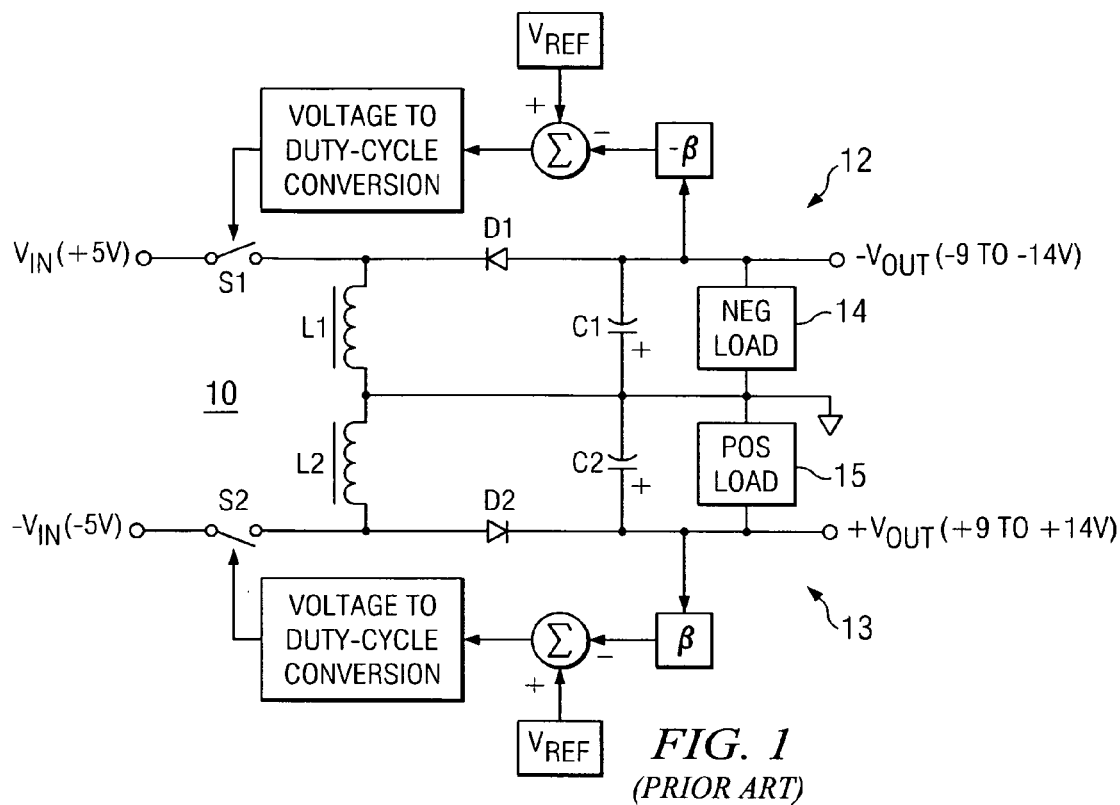
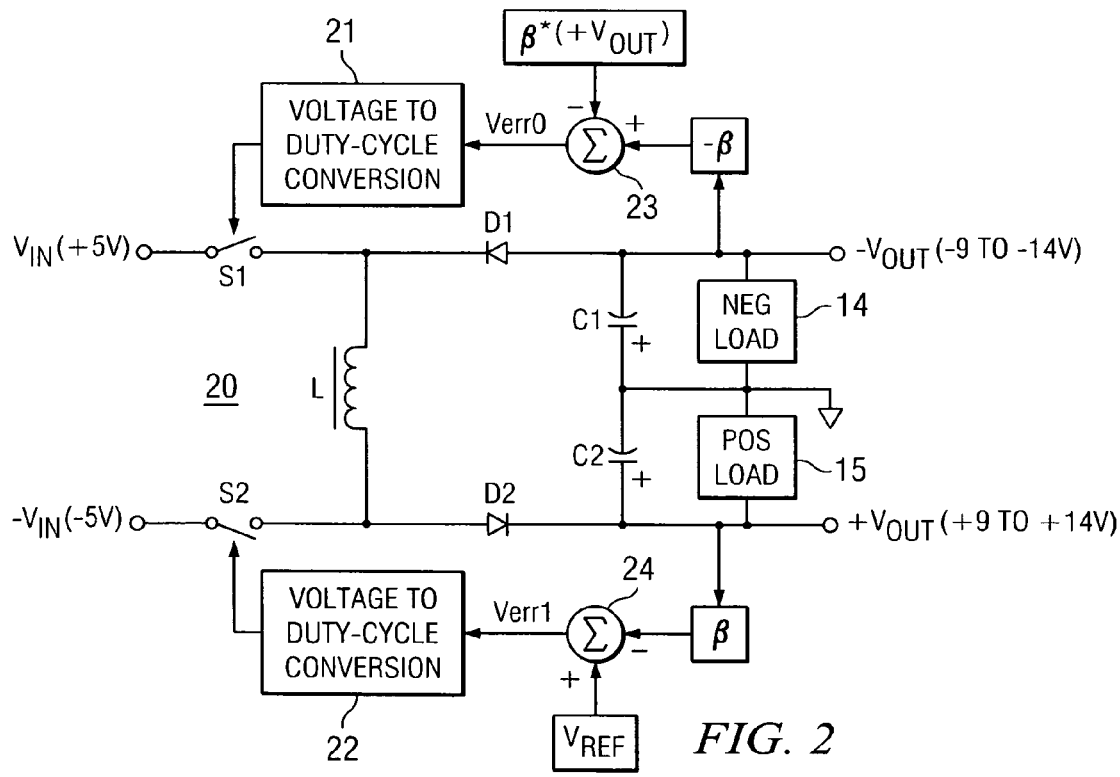

DUAL BUCK-BOOST CONVERTER WITH SINGLE INDUCTOR

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

The present invention relates generally to power converters, and relates more particularly to a dual buck-boost power converter with independent regulation.

2. Description of Related Art

Dual buck-boost converter topologies are available for a number of applications. Typically, two different power supplies create two separate outputs. The two separate outputs are often a positive voltage output and a negative voltage output.

Referring to FIG. 1, a buck-boost converter with two inputs and two outputs is illustrated as circuit 10. Circuit 10 includes two of each component, such as two switches S1, S2, two diodes D1, D2, two inductors L1, L2 and two capacitors C1, C2. The two power supplies, indicated as circuit 12 and 13, each have a separate feedback circuit to provide a closed loop control. Circuit 12 and 13 each use a reference voltage in conjunction with a feedback voltage value to determine modulation of the voltage to duty cycle conversion. In circuit 10, two separate inputs of +/−5V are used to generate the two separate outputs, +Vout and −Vout. In addition, there are typically two separate loads, negative load 14 and positive load 15.

In circuit 10, switches S1 and S2 are operated to control power output to loads 14 and 15 according to the desired set point determined by voltage Vref. In controlling the output to loads 14 and 15, inductors L1 and L2 are separately charged or discharged. Accordingly, circuit 10 uses two separate inductors that typically are realized as external components due to their size. That is, the majority of components in circuit 10 can be formed in an integrated circuit with the noted exception of inductors L1 and L2. The use of two inductors also adds cost to the circuit in terms of component cost and increased size that is realized in constructing the converter.

An alternative to circuit 10 provides a buck-boost converter that drives a positive and negative output voltage on alternating cycles of the controller respectively. This alternate method uses one inductor, but suffers from being less efficient in power density and device utilization. The outputs of this alternative prior circuit using a single inductor also has very high ripple voltage on both outputs +Vout and −Vout.

In some buck-boost solutions that deliver dual outputs, a load balancer is sometimes used to help maintain the output voltages at consistent and opposite levels. However, the load balancer typically draws extra power by shunting voltage or current, and reduces the overall efficiency of the power converter.

Accordingly, it would be desirable to obtain a buck-boost converter with a dual output and single inductor with improved efficiency and performance.

BRIEF SUMMARY OF THE INVENTION

In accordance with the present invention, there is provided a dual output buck-boost converter with a single inductor and independently regulated outputs. According to an exemplary embodiment, the buck-boost converter has two inputs and two outputs. The inputs are switched in accordance with a duty cycle control to regulate output voltage. A feedback comparison for the converter uses a pre-specified voltage reference for one of the voltage outputs, and uses an output dependent voltage references for another of the outputs. The duty cycle control is generated based on the comparison with the reference voltages, so that the duty cycle for one switch is based on a pre-specified reference voltage, while the duty cycle of another switch is based on a comparison with an output voltage. The feedback control configuration provides inherent or automatic load balancing and adjustments to variations in input voltage supplies.

According to an advantage of the present invention, a surge at either of the power converter outputs is balanced and corrected within a few control cycles where the input switches are appropriately switched. In addition, if either of the outputs sags below a desired value, the change is compensated and corrected within several control cycles by appropriately switching the input switches. The input switches can have differing on times to adjust the positive or negative output voltage.

According to an aspect of the present invention, the power converter runs in discontinuous mode. A switch duty cycle is modified during a control cycle to compensate variations in output voltages for either a negative or positive output voltage.

According to another aspect of the present invention, the input switches are complementary bipolar switches. In accordance with a particular embodiment of the present invention, the switches and other solid state devices, such as diodes, for example, are contained within an integrated circuit (IC), that also includes control circuitry. In accordance with this embodiment, power capacitors and a single inductor are supplied as external components to the IC.

According to another aspect of the present invention, a PNP switch on an input to the power converter is switched off earlier or later than an NPN switch on another input to the power converter. The switches are coupled together through a single inductor, and are operated to provide power to the high and low side outputs in every switching cycle.

According to a method of the present invention, pulse widths of a single switching operation are increased to increase output voltage, and decreased to decrease output voltage. If a positive voltage output becomes higher than the corresponding negative voltage output, the input switch for the negative voltage receives a shorter width pulse. If the negative voltage becomes higher than the corresponding positive voltage output, the input switch associated with the negative output receives a longer width pulse. With this control method, the load is automatically balanced between the two outputs and a single inductor can be used.

In accordance with another aspect of the present invention, power converter input switches are controlled based on a differential and common mode feedback signal, applied to separate polarity input switching controls. One polarity switch operates based on a differential mode feedback signal, while the other polarity input operates on a common mode feedback signal. By providing the two different modes of feedback with the different polarities, the output of the power converter can be inherently or automatically balanced.

BRIEF DESCRIPTION OF THE SEVERAL VIEWS OF THE DRAWINGS

The features and advantages of the present invention will become apparent from the following description read in conjunction with the accompanying drawings, in which:

FIG. 1 is a circuit block diagram of a conventional dual output buck-boost converter;

FIG. 2 is a circuit block diagram of an embodiment of a dual output buck-boost converter in accordance with the present invention;

DETAILED DESCRIPTION OF THE INVENTION

Figure 3:
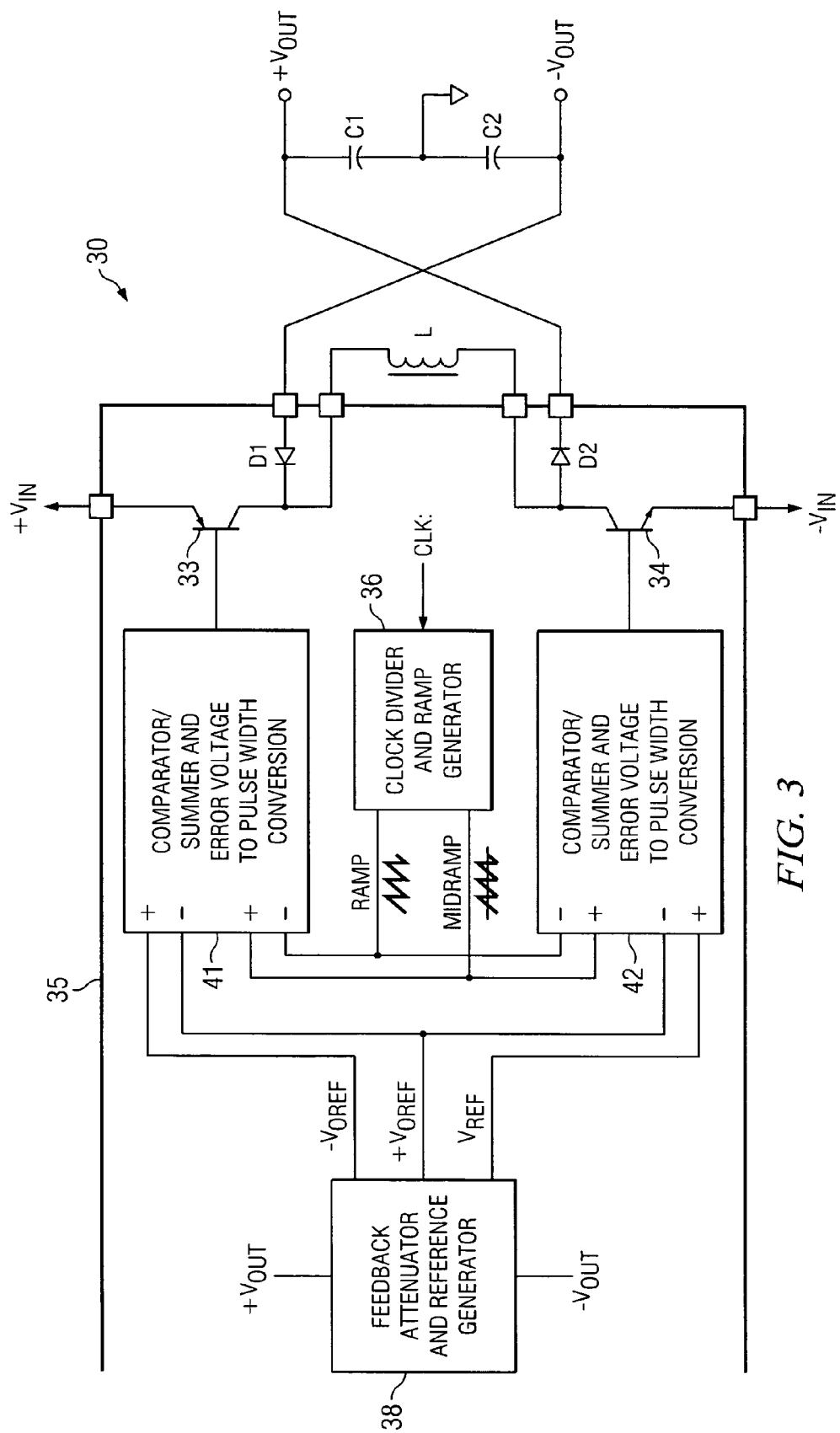
FIG. 3 is a circuit block diagram of another embodiment of a dual output buck-boost converter in accordance with the present invention.

Referring now to FIG. 2, a circuit block diagram of a dual buck-boost converter in accordance with the present invention is illustrated as circuit 20. Circuit 20 includes a single inductor L coupled between switches S1 and S2 that are operable to switch input voltage for the separate inputs. In the embodiment illustrated by circuit 20, switch S switches +5V input into circuit 20 while switch S2 switches −5V input into circuit 20. Switches S1 and S2 are controlled by voltage to duty cycle converters 21 and 22, respectively. Converters 21 and 22 are driven based on an error signal generated by summing junctions 23 and 24, respectively.

Summing junction 24 operates by subtracting an output feedback value from reference voltage Vref to generate an error voltage Verr1. The output feedback value is determined from output voltage +Vout multiplied by a feedback ratio β. Accordingly, summing junction 24 realizes the error voltage feedback equation $$Verr1 = Vref - (+Vout*\beta).$$

Error voltage Verr1 generated at the output of summing junction 24 is applied to duty cycle converter 22 to produce the appropriate switch on and off times for switch S2.

Summing junction 23 operates by subtracting an output feedback related value from output feedback −Vout multiplied by feedback ratio −β to generate an error voltage Verr0. The output feedback related value is determined from output voltage +Vout multiplied by a feedback ratio β. Accordingly, summing junction 23 realizes the error voltage feedback equation $$Verr0 = (-Vout*-\beta) - (+Vout*\beta).$$

The resulting error voltage is applied to duty cycle converter 21, to produce the switching control signals for switch S1.

According to an aspect of circuit 20, the voltage feedback configuration can be viewed as the combination of a differential voltage feedback and a common mode voltage feedback to achieve the desired control signals for switches S1 and S2. Summing junction 24 compares positive output voltage +Vout with voltage reference Vref to provide a common mode feedback signal. Summing junction 23 compares negative output voltage −Vout with an inverted positive output voltage +Vout to obtain a differential mode feedback signal applied to duty cycle converter 21. By using both common mode and differential mode feedback to control switches S1 and S2, a simple, balanced and robust control for a dual output buck-boost converter is obtained.

Circuit 20 operates by generating a feedback control from positive output voltage +Vout based on a comparison with reference voltage Vref. A feedback from negative output voltage −Vout is inverted and compared to positive output voltage +Vout. In addition, the polarity of the comparison at summing junction 23 is opposite to the polarity provided at summing junction 24. If positive output voltage +Vout changes beyond a desired threshold or range, duty cycle converter 22 applies a duty cycle control to switch S2 to vary the pulse widths of switch S2. If positive output voltage +Vout is greater than desired, the pulse widths applied to switch S2 are reduced. Similarly, if positive output voltage +Vout is to be increased, the pulse widths applied to switch S2 are increased as well. This scenario follows the conventional control methodology.

In the case of negative output voltage −Vout, duty cycle converter 21 applies a pulse width control to switch S to increase or reduce output voltage −Vout as desired. However, an increase in the magnitude of negative output voltage −Vout is achieved by reducing a pulse width of switch S1, while a reduction in the magnitude of negative output voltage −Vout is obtained by increasing a pulse width of the control applied to switch S1. Surprisingly, this result is achieved by applying a control that appears to be opposite to that which would otherwise be intuitive. That is, the desired result is achieved by controlling pulse width in an opposite relationship to that of the desired direction of negative output voltage change.

Relative switching times for switches S1 and S2 are similar if changes to output voltages +Vout and −Vout occur simultaneously. For example, if output voltages +Vout and −Vout both increase at the same time, or with the same magnitude, the respective pulse widths for switches S1 and S2 decrease together. If the output voltages +Vout and −Vout both decrease at the same time, or with the same magnitude, the control for circuit 20 increases the pulse widths for both switches S1 and S2. The corresponding increases or decreases in pulse widths produce desired increases or decreases in both outputs +Vout and −Vout.

If there is a difference in the magnitudes of output voltages +Vout and −Vout, the pulse widths applied to turn on switches S1 and S2 become unequal to compensate for the difference in output voltages. If the magnitude of positive output voltage +Vout becomes greater than the magnitude of negative output voltage −Vout, the pulse width of the signal applied to turn on switch S1 becomes shorter. Shortening the pulse applied to switch S1 creates an uneven switching event with respect to the on times of switches S1 and S2. Accordingly, when switch S2 is on and switch S1 is turned off due to the shortened pulse width, current flows in circuit 20 from negative output voltage −Vout to negative input voltage −Vin, thereby increasing the magnitude of negative output voltage −Vout. During this event, inductor L is energized with the current flowing from output voltage −Vout to input voltage −Vin.

If the magnitude of negative output voltage −Vout becomes greater than the magnitude of positive output voltage +Vout, the pulse width of the switching signal applied to switch S1 becomes longer. Accordingly, switch S1 stays on while switch S2 is switched off in this circumstance. With switch S1 on, current flows from positive input voltage +Vin to positive output voltage +Vout, thereby increasing the magnitude of positive output voltage +Vout. Again, current flowing from positive input voltage +Vin to positive output voltage +Vout tends to charge inductor L.

In each of the cases where the positive and negative output voltages differ in magnitude, inductor L is energized because of the configuration of switches S1 and S2. In each instance, current flows in the same direction through inductor L, thereby storing energy that is redistributed to outputs +Vout and −Vout as the difference between the magnitude of the output voltages decreases. Accordingly, the efficiency of circuit 20 is very high, and power is provided to each of the positive and negative outputs with each switching cycle.

Referring now to FIG. 3, another embodiment of the present invention is illustrated as circuit 30. Circuit 30 includes two complimentary bipolar transistors 33, 34 that operate as switches S1 and S2 according to the previous embodiment discussed above. Switch 33 is a PNP transistor, while switch 34 is an NPN transistor. It should be apparent that any appropriate types of switches and associated components may be used. For example, Two MOSFET switches may be used in place of each bipolar switch 33, 34, to maintain bi-directional switching with reduced on resistance.

Switches 33, 34 and diodes D1 and D2 are illustrated as being contained within IC 35. Control circuitry within IC 35 includes a feedback attenuator and reference generator block 38 for generating reference voltage Vref and feedback voltages +Voref and −Voref. Feedback voltage +Voref represents positive output voltage +Vout, as conditioned by block 38. Similarly, feedback voltage −Voref represents negative output voltage −Vout, again conditioned by block 38. Feedback voltage +Voref is delivered to the inverting inputs of comparator/summer blocks 41 and 42 in accordance with the present invention. Negative feedback voltage −Voref is provided to the non-inverting input of comparator/summer block 41 alone. Blocks 41 and 42 provide pulse width conversion operation based on the comparison/summer results, and operate switches 33 and 34 accordingly. A clock divider and ramp generator 36 provides the wave forms used to develop the pulse signals provided to switches 33 and 34.

IC 35 has outputs connected to positive input voltage +Vin and negative output voltage −Vin, positive output voltage +Vout and negative output voltage −Vout, and inductor L. Accordingly, IC 35 can match the footprint and functional connectivity provided by prior conventional buck-boost converters with dual outputs. A significant difference in the connections provided to IC 35 is the connection of a single inductor L where previously two different inductors were connected. Accordingly, the present invention realized in IC 35 can provide a simple replacement solution in dual output power converters that need only have a single inductor coupled to IC 35.

Figure 4:
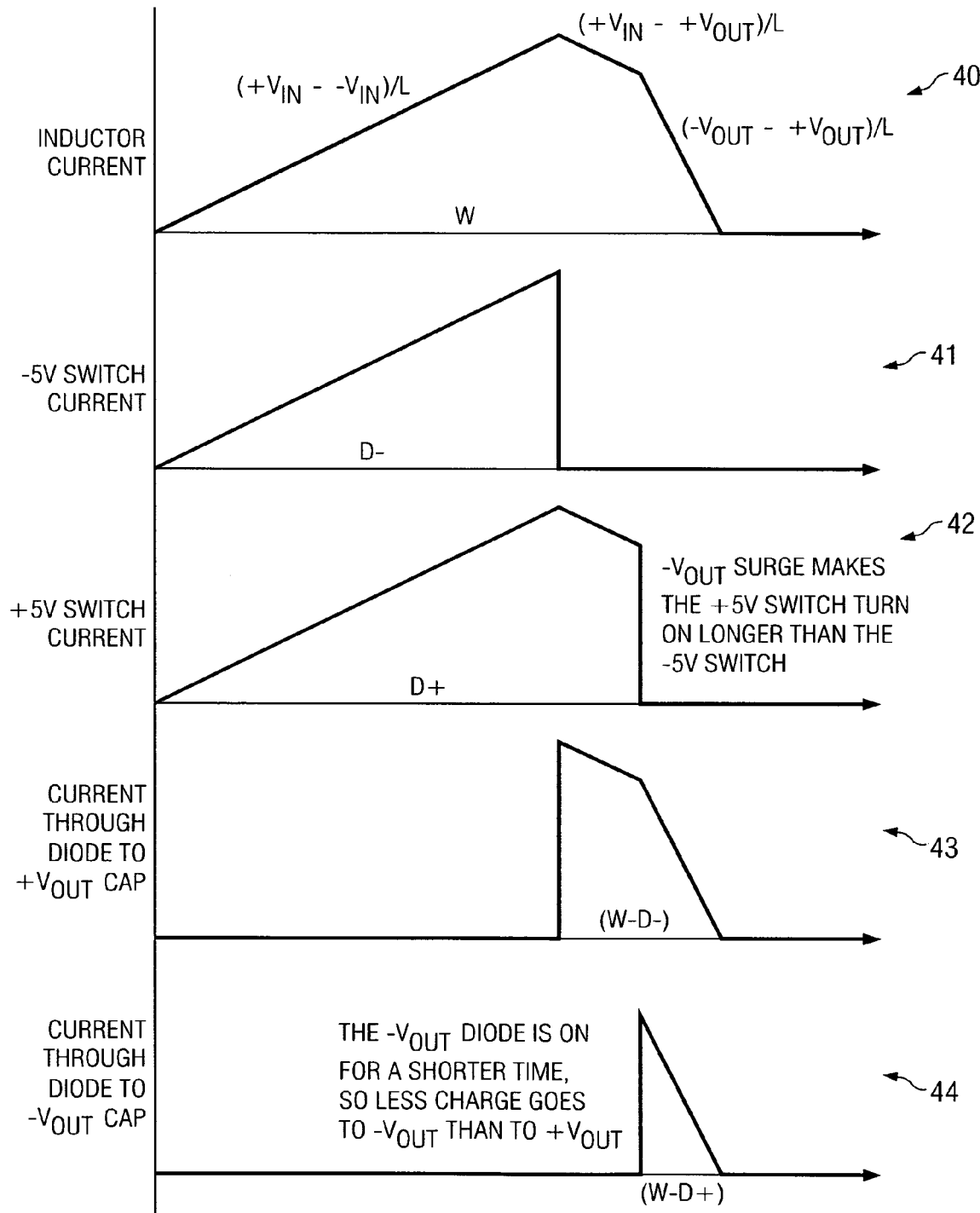
FIG. 4 is a set of graphs illustrating switching operations for pulse width control in accordance with the present invention.

Referring now to FIG. 4, a series of graphs illustrating operation of circuits 20 or 30 is illustrated. Graph 40 illustrates inductor current over the course of a switching cycle in which negative output voltage −Vout has surged in a negative direction, or has an increased magnitude with respect to positive output +Vout. Positive output voltage +Vout has not changed. The overall width of the interval where current is flowing through inductor L is represented as W in graph 40. The various slopes of the currents through inductor L are indicated on graph 40, with an initial slope of (+Vin−−Vin)/L. The second slope of inductor current is given as (+Vin−+Vout)/L. The third slope illustrated in graph 40 is given by (−Vout−+Vout)/L. The period during which switches S1 and S2 are conducting are illustrated as D+ and D−, respectively. The components of graph 40 are illustrated in graphs 41-44 to assist in the explanation of the operation of circuits 20 and 30.

Graph 41 illustrates the negative input voltage −Vin current in switch S2 or switch 34, indicated as D−. Because the switching interval for switch S2 or switch 34 does not change when negative output voltage −Vout surges in the negative direction, the initial ramp ends at a time consistent with the value of reference voltage Vref. However, because negative output voltage −Vout has a greater magnitude than positive output voltage +Vout in this example, the interval of D+, or when switch S1 or switch 33 is on, becomes longer. The longer pulse width for switch S1 or switch 33 is partially due to the polarity of the comparison between positive output voltage +Vout and negative output voltage −Vout. Accordingly, graph 42 illustrates switch S1 or switch 33 being turned on longer than switch S2 or switch 34, so that interval D+ exceeds that of interval D−.

Graph 43 illustrates the current through diode D2, which matches the profile of inductor current illustrated in graph 40 for that interval. The interval is indicated in graph 43 as W-D−. Similarly, graph 44 illustrates the current through diode D1, which occupies a smaller interval than the current through diode D2 illustrated in graph 43. The current through diode D1 in graph 44 exists for a shorter period of time, so less charge goes to capacitor C2 than goes to capacitor C1. Accordingly, the magnitude of the negative output voltage −Vout is reduced, and the surge on the negative output is corrected. Complete correction of the voltage surge can occur over a number of cycles in accordance with the control of the present invention.

While FIG. 4 illustrates the case where the magnitude of the negative output voltage −Vout has increased above the magnitude of the positive output voltage +Vout, the other cases of differences between the output voltages are readily determined. For example if negative output voltage −Vout decreases in magnitude towards zero relative to positive output voltage +Vout, then the interval indicated as D+ in graph 42 will decrease below the interval D− indicated in graph 41. The interval illustrated as W-D+ in graph 44 will increase and more charge will go to capacitor C2, thereby pushing up the magnitude of negative output voltage −Vout. As a negative output voltage is corrected, the circuit is again in balance and complete correction can be obtained in one or more control cycles.

With respect to positive output voltage +Vout sagging or surging, interval D− illustrated in graph 41 will increase or decrease, respectively, to correct the error. At the same time, interval D+ illustrated in graph 42 adjusts to have negative output voltage −Vout track with positive output voltage +Vout, as occurs in the cases described above. In instances where both positive and negative outputs sag or surge together, both intervals D− and D+ illustrated in graphs 41 and 42 will increase or decrease, respectively. The interval W during which inductor L is conducting current is typically shorter than the switching cycle period, while the power converter runs in discontinuous mode.

It should be apparent that while the present invention is illustrated as having positive output voltage +Vout applied to the feedback for control of negative output voltage −Vout, the opposite configuration is also contemplated within the scope of the present invention. That is, if negative output −Vout were applied as a reference in the feedback for positive output voltage +Vout, the tenets of the present invention would still hold true, with the accompanying changes in polarity for the summing junction.

Although the present invention has been described in relation to particular embodiments thereof, other variations and modifications and other uses will become apparent to those skilled in the art from the description. It is intended therefore, that the present invention be limited not by the specific disclosure herein, but to be given the full scope indicated by the appended claims.

What is claimed is:

1. A power converter circuit, comprising:
   (a) first and second inputs for connection to first and second input voltage sources, respectively;
   (b) first and second nodes for connection to terminals of an inductor;
   (c) a first switch between said first input and said first node;
   (d) a second switch between said second input and said second node;
   (e) first and second power outputs coupled to said first and second nodes, respectively; and
   (f) a controller for said first and second switches, said controller operable to control said first switch in response to a first error signal determined by a voltage at said first output and a reference voltage, and said controller operable to control said second switch in response to a second error signal determined by said voltage at said first output and a voltage at said second output.

2. The power converter circuit of claim 1, wherein said controller includes first and second voltage-to-duty-cycle converters with outputs for said first and second switches, respectively, and with inputs for said first and second error signals, respectively.

3. The power converter circuit of claim 2, wherein said first error signal is determined as said reference voltage minus said first output voltage scaled by a feedback factor, and said second error signal is determined as said second output voltage inverted and scaled by said feedback factor minus said first output voltage scaled by said feedback factor.

4. The power converter circuit of claim 1, wherein said first switch is an npn transistor, said second switch is a pnp transistor, a first diode connects said first output to said first node, and a second diode connects said second output to said second node.

5. A dual buck-boost converter, comprising:
   (a) first and second inputs connected to negative polarity and positive polarity input voltage sources, respectively;
   (b) first and second nodes connected to terminals of an inductor;
   (c) a first switch between said first input and said first node;
   (d) a second switch between said second input and said second node;
   (e) positive polarity and negative polarity power outputs connected through first and second diodes to said first and second nodes, respectively; and
   (f) a controller for said first and second switches, said controller operable to control said first switch in response to a first error signal determined by a voltage at said positive polarity output and a reference voltage, and said controller operable to control said second switch in response to a second error signal determined by said voltage at said positive polarity output and a voltage at said negative polarity output.

6. A method of power conversion, comprising the steps of:
   (a) determining a first error voltage as $V_{REF} - \beta * V_{OUT+}$ where $V_{REF}$ is a reference voltage, $\beta$ is a feedback factor, and $V_{OUT+}$ is the voltage at a positive polarity output;
   (b) determining a second error voltage as $-\beta * V_{OUT-} - \beta * V_{OUT+}$ where $V_{OUT-}$ is the voltage at a negative polarity output;
   (c) using said first error voltage to drive a first voltage-to-duty-cycle converter to control a first switch where said first switch connects a negative polarity input to a first terminal of an inductor and through a diode to said positive polarity output; and
   (d) using said second error voltage to drive a second voltage-to-duty-cycle converter to control a second switch where said second switch connects a positive polarity input to a second terminal of said inductor and through a diode to said negative polarity output.

* * * * *